Jan. 6, 1970  R. R. ELSASSER  3,488,680
APPARATUS FOR PRODUCING SHAPED TUBING AND BARS
Filed Jan. 3, 1967  6 Sheets-Sheet 4

INVENTOR:
ROBERT R. ELSASSER
BY
Gravely, Lieder & Woodruff
ATTORNEYS,

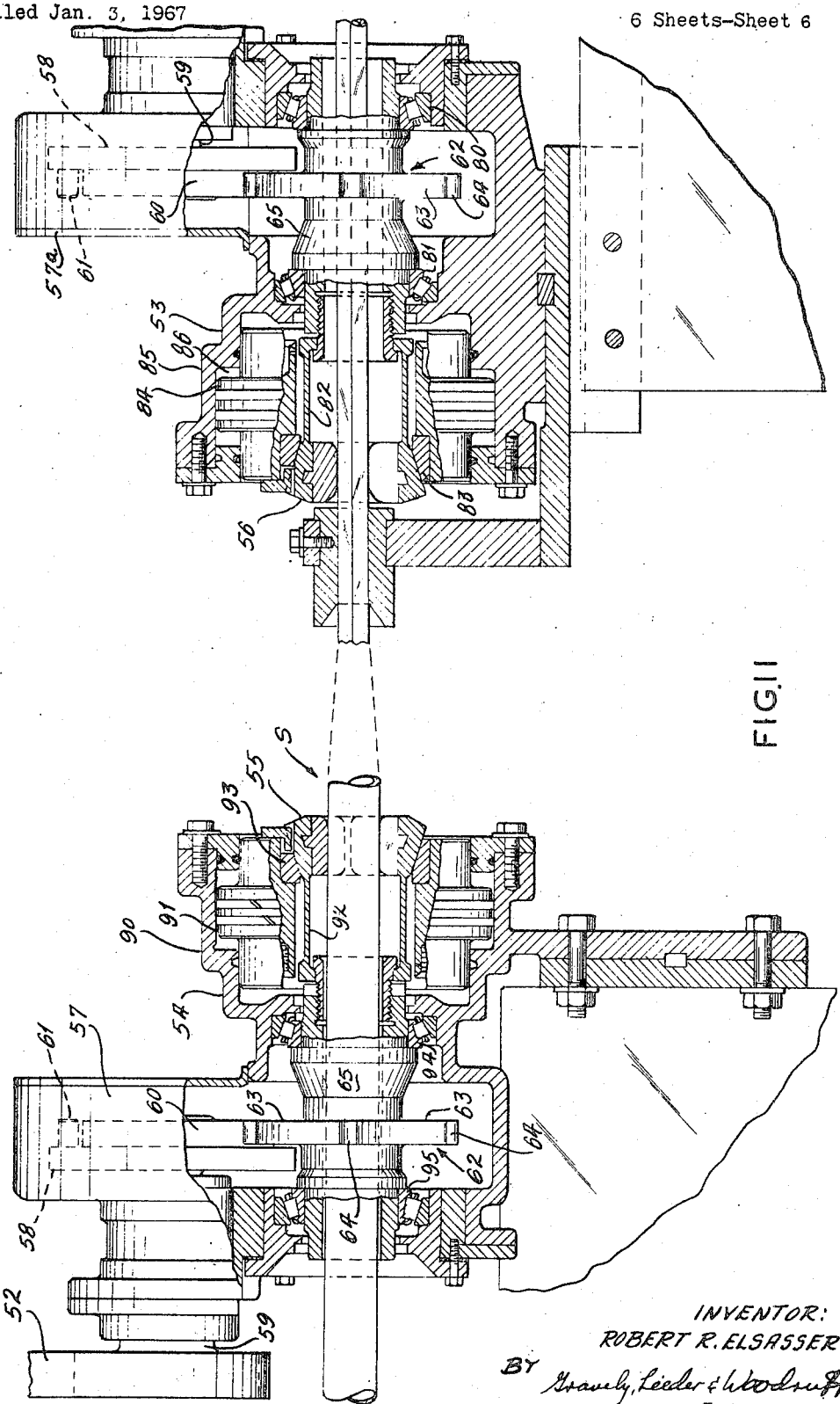

United States Patent Office 3,488,680
Patented Jan. 6, 1970

3,488,680
APPARATUS FOR PRODUCING SHAPED
TUBING AND BARS
Robert R. Elsasser, Canton, Ohio, assignor to The Timken
Roller Bearing Company, Canton, Ohio, a corporation
of Ohio
Filed Jan. 3, 1967, Ser. No. 606,978
Int. Cl. B21b 21/06; B21c 41/04; B21d 43/05
U.S. Cl. 72—214                                    12 Claims

ABSTRACT OF THE DISCLOSURE

An apparatus having a pair of counter-rotating dies provided with opposed grooves into which circular stock is inserted. At their shape starting ends the opposed grooves form a circular cross-sectional shape, while at their opposite ends they define a non-circular cross-sectional shape, so that a corresponding non-circular shape is imparted to the stock as the dies engage and pass over it. Means are provided for gripping and rotationally indexing the stock when the dies over-travel one of the ends of the grooves.

---

This invention relates to the production of shaped tubing and is particularly concerned wtih improvements in the apparatus for effecting the production of shaped tubing.

In the past various means have been proposed for producing predetermined shapes for tubing or rod stock. In connection with such proposed means the tube or rod turning was inaccurately accomplished by complicated mechanism or by following an interrupted cycle in which the action of the turning device was combined in a cold Pilger mill. Very little success was experienced with such means, due mainly to the extremely complicated mechanism which was of questionable practicality.

The present apparatus of this invention is directed to a cold rolling mill of simple construction and operation to effectively and economically operate the profiling dies, and to operate also a very simple stock turning means which will, in timed phase with the mill operation, rotate the stock accurately and precisely as required for the purpose of producing a desired profile.

Accordingly, it is an important object of the present invention to improve upon apparatus heretofore proposed for producing shaped tubing.

It is also an important object of the present invention to take advantage of the simplicity and accuracy of a Geneva movement for repetitiously turning the tube stock between reduction passes of the forming dies so that the angle of rotation or turning of the tube stock will always have a definite relationship to the number of sides in the profile of the finished product.

It is still another object of the present invention to provide an improved apparatus for producing shaped tubing by apparatus that has repetitive, precise turning angle means combined with an improved die whose forming groove is the cross-section or profile of the tube stock to be produced.

Other objects and advantages of the present invention will be set forth in connection with the disclosure of a preferred form of apparatus, and reference will be directed throughout the following specification to the several views in the drawings, wherein:

FIG. 11 is a fragmentary sectional view at line 11—11 in FIG. 1 showing the stock gripping and turning means.

Figure 1:
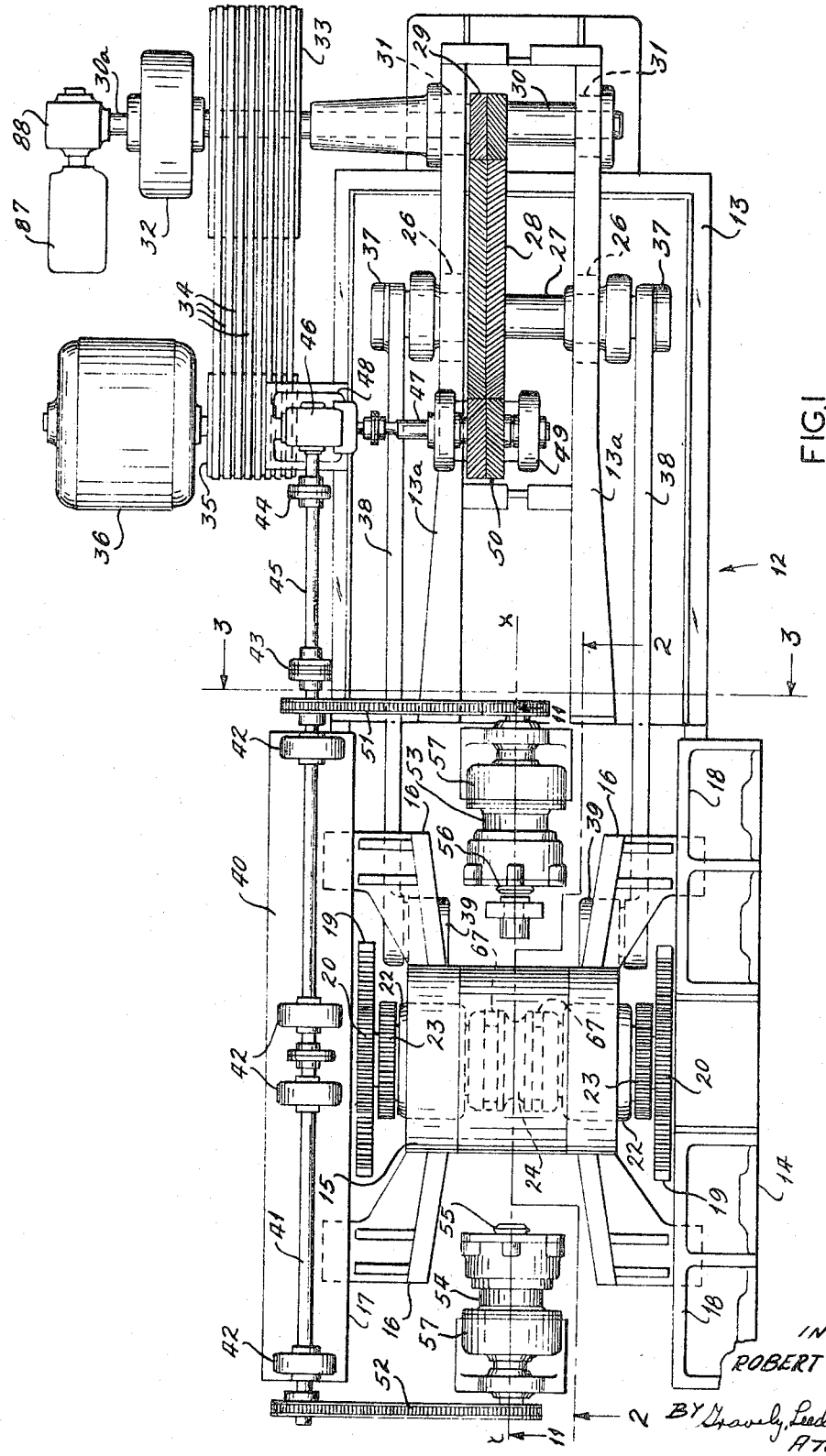
FIG. 1 is a plan view of the apparatus utilized in the production of shaped tubing.
Figure 2:
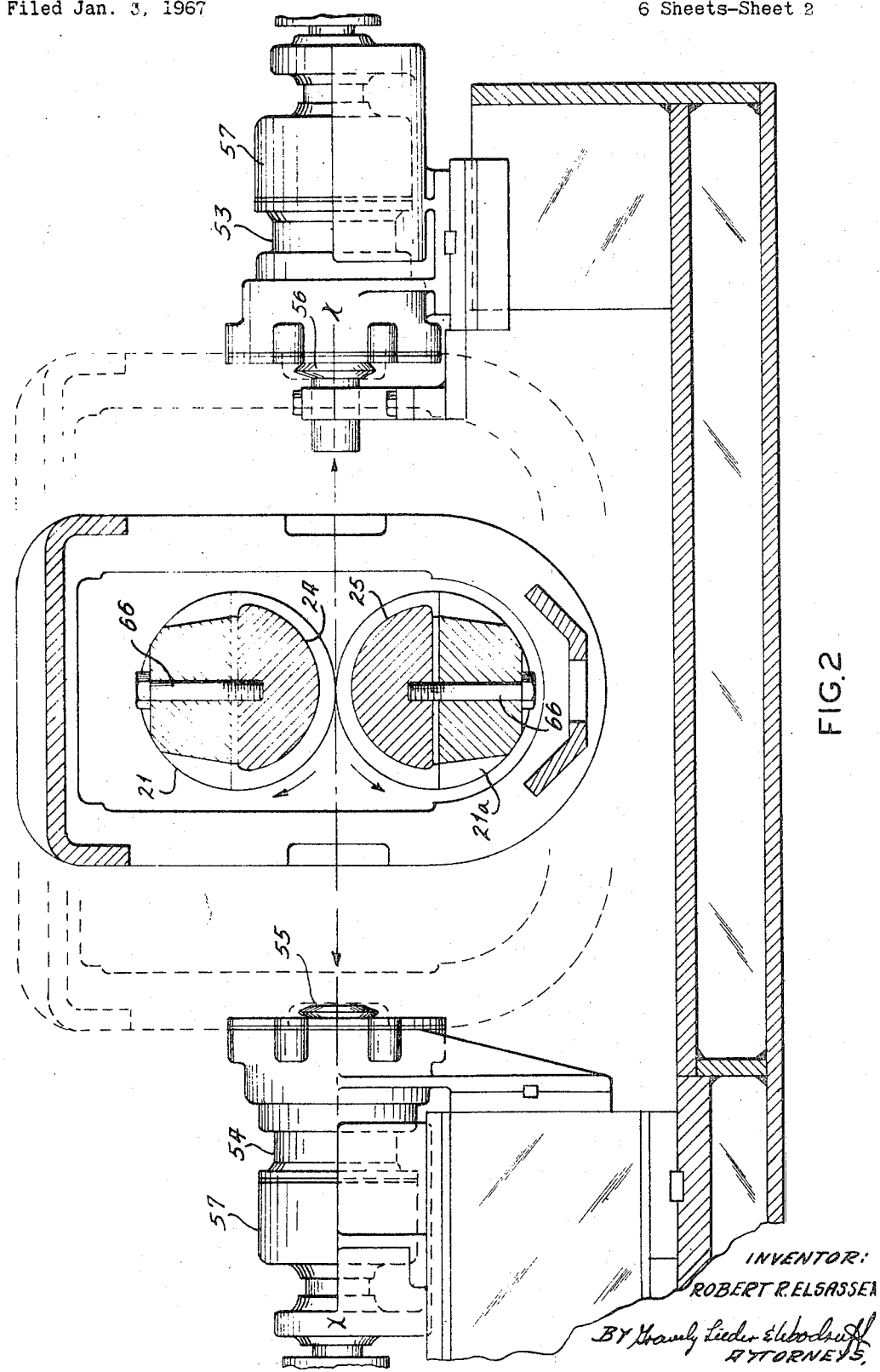
FIG. 2 is a fragmentary longitudinal sectional elevational view as seen in line 2—2 in FIG. 1.
Figure 3:
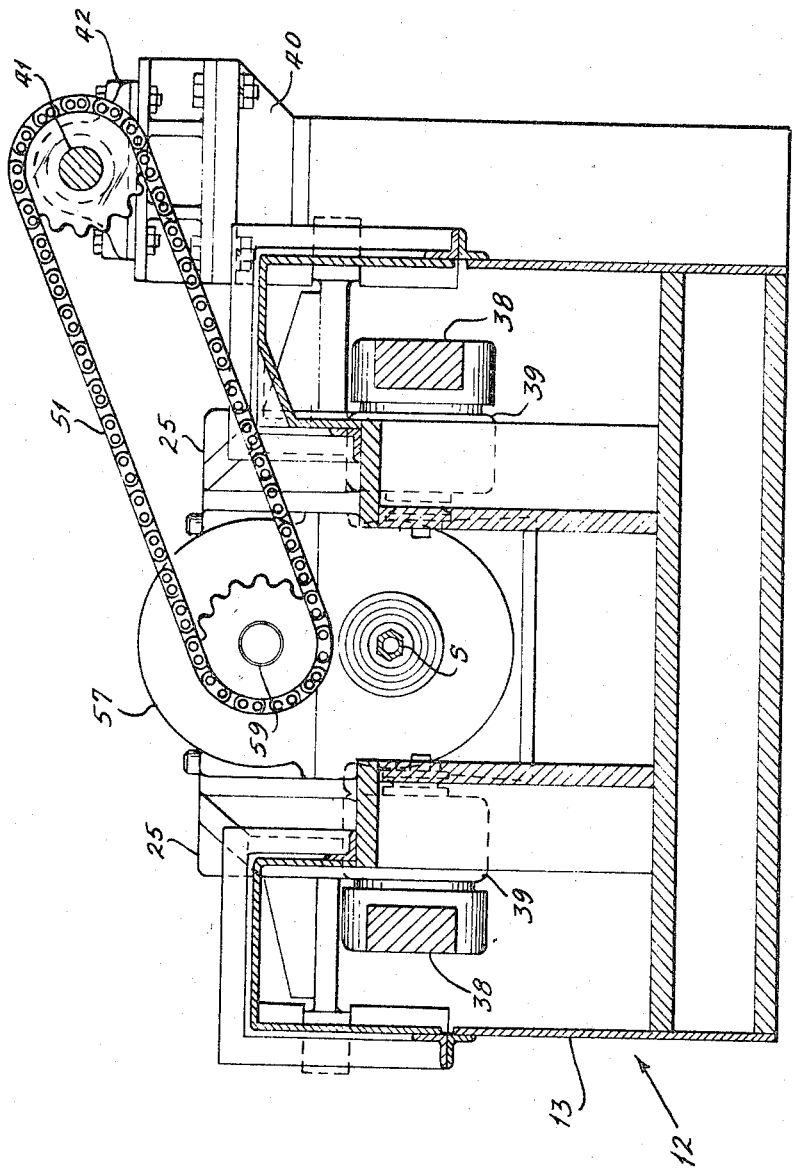
FIG. 3 is an enlarged transverse sectional view seen at line 3—3 in FIG. 1.

Reference will now be directed to FIGS. 1, 2 and 3 wherein the apparatus 12 includes a suitable frame 13 having a center stand 14 which is adapted to support the saddle structure 15 in which the forming dies are operatively mounted as will be described presently. The saddle structure 15 is operatively guided on a plurality of slides 16 which are arranged in pairs on opposite sides of the longitudinal center line X—X of the apparatus. Each pair of slides 16 is supported in suitable ways 17 and 18 which operate to maintain the saddle structure moving in a fixed line which is generally horizontal. The center frame section 14 is provided with a pair of racks 19 which are fixed in position and cooperate with rack gears 20. The gears 20 are mounted on the opposite ends of a main upper shaft 21 which is suitably mounted in bearings 22 in the saddle structure 15. Each rack gear 20 carries thereon in fixed keyed relation a shaft gear 23, and these shaft gears 23 are in meshed and driving relation with a similar gear (not shown) which is located vertically directly below the main upper shaft 21. The lower shaft gears (not shown) are keyed to a main lower shaft 21a which is also supported in the saddle structure 15 in the same manner as the mounting for the main upper shaft 21. Thus there are a pair of main shafts, one upper and one lower, which are positively geared together and are caused to operate in unison through the action of the rack gears 20 in operative running engagement with the fixed racks 19. Consequently, movement imparted to the saddle structure 15 in the direction defined by the slides 16 in the ways 17 and 18 will rotate the main upper and lower shafts 21 and 21a.

As shown in FIG. 2 the main upper shaft 21 supports an upper die 24 and the main lower shaft 21a supports a lower die 25. The upper and lower dies 24 and 25 are respective mirror images of each other as will presently appear.

Sill referring to FIGS. 1, 2 and 3, the frame 13 has a pair of spaced longitudinally directed members 13a which are connected to the center stand section 14 and which extend in parallel relation on opposite sides of the longitudinal center line X—X so as to provide suitable supports for bearings 26 that carry a cross shaft 27 on which a drive gear 28 is operatively mounted. The gear 28 is meshed with a drive gear 29 operated by a power input shaft 30 which is suitably mounted in the members 13a at bearings 31. One end of the power input 30 extends outwardly to one side of the frame 13 where it is supported on an outrigger bearing 32. The shaft 30 carries a pulley 33 which is driven by a plurality of belts 34 from a motor pulley 35. The pulley 35 is driven by suitable prime mover, such as electrical motor 36. The gear 29 drives the gear 28, which, in turn, rotates the cross shaft 27. The outer ends of cross shaft 27 are provided with crank arms 37 which rotate and in so doing reciprocate connecting rods 38. The connecting rods have the outer ends operatively connected at lugs 39 which are an integral part of the saddle structure 15. The lugs 39 are also shown in FIG. 3. It is now understood in what manner the saddle structure 15 is caused to move back and forth relative to the racks 19 for the purpose of obtaining concurrent rotation of the main upper and lower shafts, which action results in rotary operation of the upper die 24 and the lower die 25 shown in FIG. 2.

Referring to FIGS. 1 and 3, it is observed that the frame 13 is provided with a back frame structure 40 which operatively supports a counter shaft 41 maintained in operative position by a plurality of bearings 42. The counter shaft 41 is connected by a pair of couplings 43 and 44, and an intermediate shaft 45, to suitable gear box 46 which receives power from an accessory drive shaft 47. The gear box 46 is supported on suitable structure 48 which is attached to part of the frame 13, and one of the members 13a is utilized to carry the bearing structure 49 and a power take-off gear 50 that drives the accessory shaft 47 from the gear 28. Thus, the drive which effects reciprocation of the saddle structure 15 is precisely correlated with the rotation of the counter shaft 41 by means of a positive, yet simple gear drive train.

As can be seen in FIGS. 1, 2 and 3, the rotary effort of counter shaft 41 is positively transmitted, as by suitable chains 51 and 52, to a pair of combined rotation indexing and gripping means. The rotation indexing and gripping means 53 is located at the outlet end of the path of travel of the stock through the forming dies 24 and 25 and a similar means 54 is located at the inlet end for the stock. The means 54 is driven by chain 52 and the means 53 is driven by the chain 51.

The stock S (FIGS. 4–10) to be shaped is fed along the center line X—X (FIGS. 1 and 2) by any convenient means well known in this art. The rotation indexing and gripping means 54 includes a stock gripping chuck 55, which as seen in FIGURE 1, will grip the stock on entering the machine for production of the desired shape. The gripping pressure can be released when introducing new stock into the gripping chuck 55. During the normal operations, a minimum gripping pressure is maintained on the stock by gripping chuck 55 which will in a degree control the stock, but with grip light enough to permit sliding feed of the stock in the gripping chuck by a suitable feed mechanism. At the moment of turning or indexing, the gripping force of this chuck is increased hydraulically to insure proper rotation of the stock and prevent slippage due to the inertia. On the other hand the indexing and gripping means 53 has a chuck 56 formed with an internal profile of the finished stock so that it is not necessary to increase the gripping force of chuck 56 at time of rotation to prevent slippage. Therefore, constant minimum pressure is maintained on this chuck 56 during normal operations. This grip chuck 56 can, however, be released to introduce the start of a new length of stock. Thus, the grip chucks 55 and 56 cooperate to hold and turn the stock S during the passes of the forming dies 24 and 25. As has been stated the means 53 and 54 include rotation indexing means, each being operatively arranged in a housing 57 associated with the respective chucks 55 and 56. The indexing means can be best seen in FIGS. 4 and 11 and the following description will be applicable to both of these means since the parts are of the same character.

Figure 4:
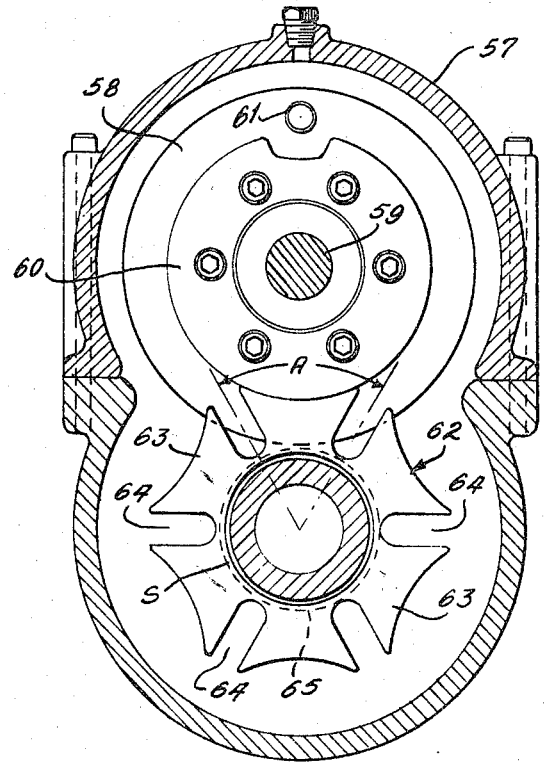
FIG. 4 is a greatly enlarged fragmentary sectional view of the Geneva movement utilized in the apparatus of FIG. 1.

As seen in FIGS. 4 and 11 the housing 57 encloses an upper rotary wheel 58 which is mounted on the drive shaft 59 driven by either chain 51 or 52 (FIG. 3). The wheel 58 is provided with a control plate 60 so that the star wheel 62 may be controlled as desired. It can be seen that the wheel 58 is provided with a single pin 61 projecting from the face of the wheel in a direction parallel to the axis of the rotation of the shaft 59. The Geneva star wheel element 62 is operatively mounted in a lower part of the housing 57 and is suitably formed with lobes 63 separated by slots 64. The slots 64 are spaced apart around a sleeve or hollow hub 65, and the respective chucks 55 and 56 are associated therewith so that when either of the chucks 55 or 56 is in gripping contact with the stock S the Geneva element 62 can be rotated or indexed in the usual manner of a Geneva movement and rotate the stock which slides through the hollow sleeve 65. The wheel 58 rotates continuously to carry the pin 61 in a constant orbit of movement. Each time the pin 61 approaches the Geneva star wheel element 62 the pin 61 will engage in one of the slots 64 and give the star wheel element 62 a rotary impulse which will displace such element a predetermined precise angular amount, depending upon the degree of arc separating the slots 64. Once the rotary impulse has been delivered the pin 61 will disengage from the slot 64 and surface 62a riding the periphery of control plate 60 will stop further indexing movement of the star wheel element 62 at precisely the correct angularly moved position.

Particular attention will now be directed to FIG. 2 in which it can be seen that the upper forming die 24 is connected to the main upper shaft 21 by a plurality (one only being shown) of securing means 66. It is usual in securing a removable die to utilize clamps for further assuring rigidity of the die with its drive shaft. Such clamping means has been omitted from FIG. 2 but the same has been indicated in outline at 67 in FIG. 1. There is also shown in FIG. 2 similar securing means 66 for attaching the lower forming die 25 to the main lower shaft 21a. Thus the forming dies 24 and 25 are caused to rotate as mirror images of each other.

Figure 5:
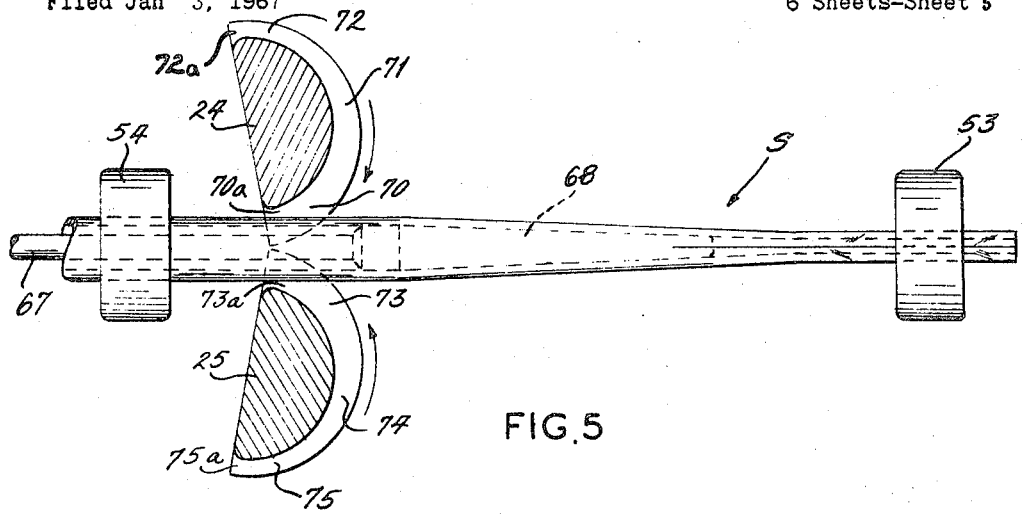
FIGS. 5, 6 and 7 are respectively schematic views of the forming dies and the stock and supporting mandrel at three important stages in the sequence of operation of the forming dies.
Figure 6:
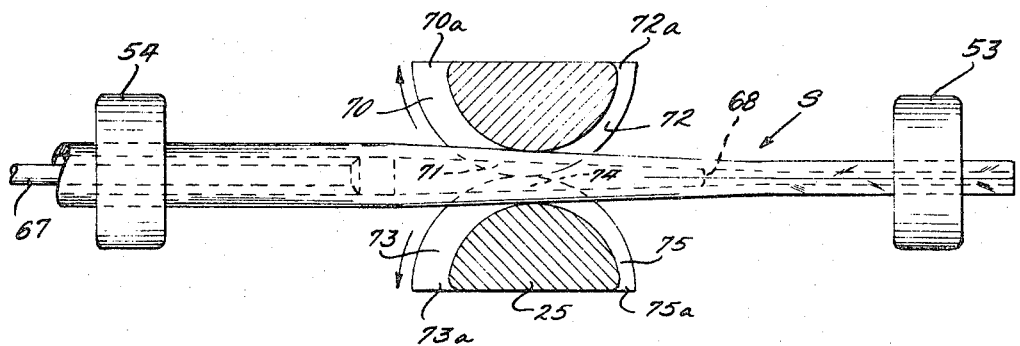

In FIG. 5 there has been diagrammatically illustrated the operating forming dies and other parts of the apparatus shown in FIG. 1. The indexing and gripping means 54 is shown as a single box to simplify the drawing of the separate gripping chuck 55 and housing 57 depicted in FIG. 1. In like manner the rotating index and gripping means 53 at the outlet end of the stock travel is shown as the box 53 in FIG. 5. The stock S is suitably fed in from the left side of FIG. 5 (such as by the means generally shown in Patent 2,703,999) and is supported on a mandrel 67 whose end is a tapered enlargement 68 which has been preshaped to allow for the reduction in the profile of the interior of the tubular stock. The mandrel 67 and its end 68 move with the stock during rotation thereof, but the mandrel is prevented from advancing axially by suitable means not necessary to show here. The upper forming die 24 has a groove therein which at its deepest portion 70 is semicircular in cross section. The middle portion of the forming groove begins to be reduced in depth and is shaped to initiate the desired profile of the finished product. This middle portion of the forming groove is shown at 71. The final portion of the forming groove is shown at 72 and it is in this portion that the eventual final profile is reproduced. Thus, the semi-circular shaping of the forming groove in the die 24 corresponds with the profile shapes illustrated respectively in FIGS. 8, 9 and 10, where the profile of FIG. 8 corresponds with the profile of groove portion 70, the profile of FIG. 9 corresponds with the grooved profile section 71 and the profile in FIG. 10 corresponds with the grooved profile portion 72. The groove portions 70 and 72 have relief portions 70a and 72a respectively so that by rotating the die 24 from a starting position as shown in FIG. 5 which is rocked counterclockwise or to the left of a position in which the back face of the die block is vertical, the relief profile 70a will permit disengagement of the die and the stock. It can be observed in comparing FIGS. 6 and 7 with FIG. 5 that the die 24 will roll on the stock S as the saddle structure 15 moves to the right (as viewed in FIG. 1) and eventually the die 24 will assume the position in FIG. 7 where it has rotated more than 180° from the position shown in FIG. 5. As a result of this overtravel in relation to 180° of travel, the relief portion of the die profile 72a will permit disengagement of the die 24 with the stock S.

What has been described in connection with the upper die 24 is equally applicable to the lower die 25 and the portions of the die profile corresponding to those described in the die 24 are shown at 73, 74, and 75, with the initial relief portion shown at 73a and the final relief portion shown at 75a. Thus, when the dies 24 and 25 are in the position shown in either FIGS. 5 or 7, there is momentarily no engagement with the stock S, and it is in this relationship of the dies and the stock that the stock can be moved longitudinally by means not necessary to show, but generally of the type shown in said Patent 2,703,999 or similar means which is well understood in this art.

In the operation of the apparatus herein above described it is clear that the connecting rods 38 reciprocate the saddle structure 15 in the longitudinal ways 17 and 18 of the stand 14 and that during the reciprocation the stationary racks 19 will cause rotation of the rack gears 20, which in turn drive the shaft gears 23 for the main upper shaft 21. The main upper shaft 21 is geared to a main lower shaft 21a located directly therebelow (see FIG. 2) so that the shafts 21 and 21a rotate in a manner such that the adjacent tangential surfaces thereof move in the same directions. The shafts 21 and 21a respectively carry the forming dies 24 and 25 as previously described.

Figure 8:
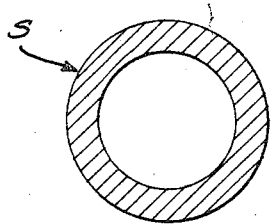
FIGS. 8, 9 and 10 are respectively transverse sectional views showing the progressive reduction of the tubular stock from its starting position in FIG. 5 through an intermediate profile operation in FIG. 6 to its final profile configuration in FIG. 7.
Figure 9:
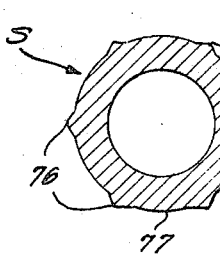
Figure 10:
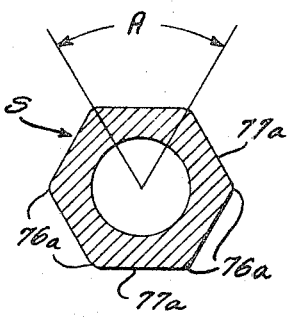

If it is assumed that the apparatus is started with the dies 24 and 25 in the position shown in FIG. 5 and that the stock has been advanced axially relative to the mandrel 67, the first forming operation of the dies 24 and 25 will be to commence reducing the circular profile of the stock as is illustrated in FIG. 8. The reduction continues until the middle portion of the dies 71 and 74 (FIG. 6) becomes effective to change the circular profile to the profile shown in FIG. 9. The profile of FIG. 9 is a rudimentary hexagonal profile in which projections 76 begin to take prominent shape due to the shaping of the grooves 71 and 74 in the respective dies 24 and 25. Further reciprocation of the saddle structure 15 will bring the dies into the position shown in FIG. 7 where the shape of the groove portions 72 and 75 will combine to produce the profile shown in FIG. 10. In this profile shaping transition the circular portions 77 (FIG. 9) have been changed to flats 77a (FIG. 10) and the projections 76 form the corners 76a of the hexagonal profile which is radially symmetrical about its center axis.

Figure 7:
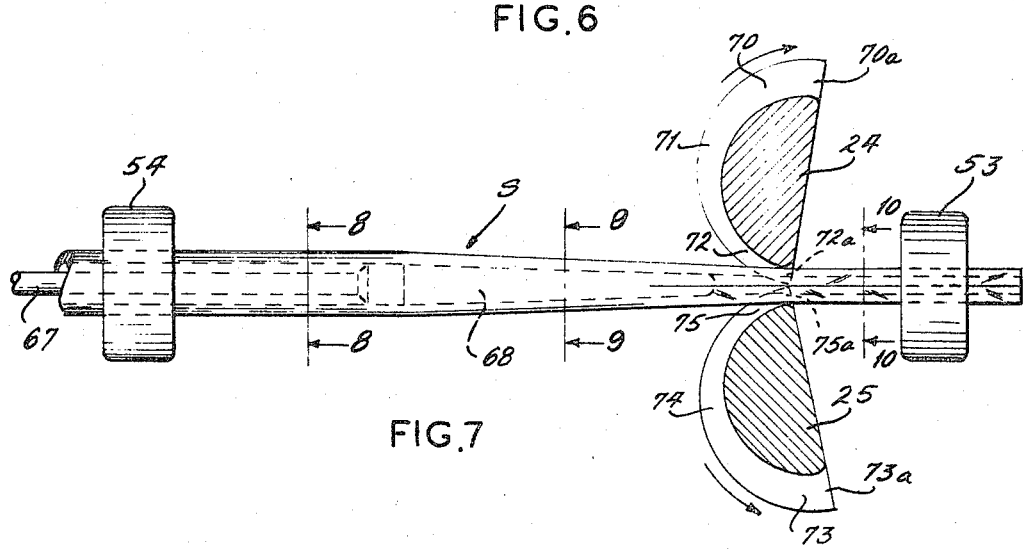

Once the dies 24 and 25 reach the position shown in FIG. 7 where the relief groove portions 72a and 75a are in opposition, the dies do not have contact with the stock S and it is at this time that the rotary indexing Geneva movement in housing 57 becomes effective to angularly index the stock the required amount so that on the return pass of the dies 24 and 25 the flat surface 77a and the corners 76a will have been indexed one step equivalent to angle of symmetry A (FIGS. 4 and 10), thereby presenting different corners and surfaces to the forming dies to prevent the development of fins that would otherwise normally be generated because of the necessary slight amount of clearance between the dies 24 and 25. The travel of the saddle structure 15 is considerably longer than the step by step feed of the stock S along the mandrel 67 so that in a single pass of the stock the forming dies 24 and 25 will engage the surfaces many times to produce a gradual reduction in the profile of the stock from its initial circular form of FIG. 8 to its final hexagonal form of FIG. 10. In this process the length of the enlarged tapered head on the mandrel 67 is chosen so as to provide maximum cooperation for the forming dies 24 and 25 and will maintain a circular or other desired internal profile for the stock S. While a mandrel 67 is used for tubing, it is understood that bar stock needs no mandrel, and the present apparatus is therefore adaptable to shaping bar stock.

Reference has previously been made to the gripping and turning means which is shown in FIGS. 1, 4 and 11. More specific reference will now be directed to FIGS. 1 and 11 in order to clarify the action of such means. The gripping and turning means 54 is mounted in a suitable housing 57, and the hollow hub 65 is carried in suitable bearings 94 and 95. The hub 65 is operatively connected to the inner end of the chuck sleeve 92 so that the two parts will rotate in unison. The stock receiving outer end of the chuck sleeve 92 has the chuck jaw elements 55 formed thereon, such jaw elements being spaced from each other by axial cuts so that the elements may move readily inwardly and outwardly. Movement of the chuck jaw elements 55 is obtained by the pressure ring 93 which is operatively mounted in a reciprocating element or control piston 91 movably mounted in cylinder portion 90 of the housing. Fluid pressure is introduced to the space 96 behind the piston 91 from a suitable source (not shown) which includes a control valve subject to monitoring from a control unit 87 (FIG. 1), which is rendered operative by being driven through a suitable gear box 88 off of the outboard end 30a of the drive shaft 30. At the proper time in the reciprocating cycle of the connecting rods 38, when the dies 24 and 25 are in the position shown in FIG. 7, the control unit 87 signals the pressure fluid to increase its pressure in the cylinder space 96. This increase in pressure causes the piston 91 to more tightly clamp the chuck jaw element 55 on the stock and thereby assures a firm grip for the purpose of effecting rotation of the stock by the action of the Geneva movement. In a similar manner, the gripping and rotating means 53 is contained in a housing 57A and such housing has an enlarged portion 85 in which a control piston 84 is operatively mounted so as to surround a chuck sleeve 82 and operatively engage the chuck jaw element 56 by the pressure ring 83. The inboard end of chuck sleeve 82 is operatively connected to the hollow hub 65 and suitable bearings 80 and 81 are provided to support the hollow hub 65 for its rotation by adjacent Geneva movement.

The control piston 84 is subject to the same minimum pressure exercised against control piston 91 during the normal working of the machine. However, this control piston 84 is not subjected to the increased pressure introduced by control unit 87 to gripping and turning means 54. Since the chuck jaw element 56 on unit 53 has a configuration other than round, slippage cannot occur during the turning or indexing movement. Consequently, the pressure need not be increased to overcome the inertia of the stock during the turning or indexing. However, it can be appreciated the coordination of the means 53 and 54 is important since the stock, in its initial introduction to the apparatus, will be subjected solely to the gripping and turning function of means 54, and at the end of the length of stock, only the unit 53 will be in control for gripping and turning. Thus, it is important that the apparatus be provided with a pair of means such as that shown at 53 and 54. It is, of course, understood that other devices may be utilized in place of the Geneva movement, such as, for example, the Ferguson cam.

It should now be clear in what manner the present apparatus operates to produce shaped tubing, and while the present disclosure has dealt with the production of hexagonal shaped tubing it is to be understood that other shapes may be produced depending on the arrangement of the pin and slots in the Geneva movement disclosed in FIG. 4. That is to say, the number of lobes 63 on the Geneva starwheel 62 may be increased or decreased in number, together with a suitable adjustment in the size of the Geneva wheel 58 and the location of the pin 61. It is understood that the presently disclosed apparatus is not to be limited unnecessarily and that modifications and variations may be included within the scope of the appended claims.

What is claimed is:

1. An apparatus for imparting a radially symmetrical non-circular shape to elongated round stock, said apparatus comprising a pair of counter-rotatable forming dies engageable with the stock at opposed grooves formed on the dies, the opposed grooves being curved about the axis of rotation for the dies and extending between shape-starting and shape-finishing ends, actuating means for moving the dies to and fro relative to the longitudinal axis of the stock and for rotating the dies such that the shape-starting ends of the groove will be generally opposite at one end of the relative movement and the shape-finishing ends will be generally opposite at the other end of the relative movement, the opposed shape-starting ends defining a generally circular cross-sectional shape which substantially conforms to the cross-sectional shape of the round stock and the opposed shape-finishing ends substantially defining the radially symmetrical non-circular cross-sectional shape, the actuating means causing the dies to over travel at least one of the ends of the grooves and free the stock for rotational indexing movement, and indexing means for rotating the stock through an angle equal to an integer multiple of the angle between radially symmetrical portions of the shaped stock when the dies have over travelled whereby when the dies again move along the stock the same cross-sectional shape will be imparted to the stock.

2. The apparatus set forth in claim 1 wherein said stock indexing means includes means to grip the stock, an indexing element connected to said grip means and a constantly rotating wheel operative to move said indexing element at least once in a revolution to effect stock indexing.

3. The apparatus set forth in claim 1 wherein said indexing means includes a chuck and means to periodically firmly tighten said chuck on the stock prior to effecting rotation of said stock and releasing it thereafter, the indexing means relaxing its grip on the stock when the dies operate on the stock.

4. The apparatus set forth in claim 1 wherein said indexing means includes first and second such means spaced apart with said die members therebetween, said first means being effective alone while the stock is being initially fed into the apparatus, said second means being effective alone while the stock is finishing its pass through the apparatus, and both said first and second means being simultaneously effective to index the stock being moved therein.

5. An apparatus according to claim 1 wherein the indexing means comprises a rotatable chuck for gripping the stock, a slotted Geneva wheel rigidly connected to the chuck for rotation therewith about the axis of rotation for the chuck, and a rotary drive wheel provided with a pin for engaging the slots of the Geneva wheel and thereby imparting incremental movement to the chuck and stock.

6. An apparatus according to claim 5 and further characterized by a frame, a carriage slidably mounted on the frame and having the forming dies journalled therein, a crank on the frame, connecting rods interconnecting the crank and carriage, whereby the carriage will reciprocate on the frame, a rack on the frame, and gears coupling the rack and forming dies so that the dies will rotate in response to reciprocation of the carriage, and wherein means are provided for positively coupling the drive wheel of the indexing means to the crank so that the drive wheel rotates at a predetermined ratio with respect to the crank.

7. An apparatus according to claim 1 wherein the chuck grips the stock only when the dies have over travelled and relaxes its grip on the stock when the dies operate on and are shaping the stock.

8. An apparatus according to claim 1 wherein the opposed shape-finishing ends of the dies define an equilateral polygonal shape, and wherein the indexing means when the dies have over travelled rotates the stock through an angle equal to the angle between radially symmetrical portions of the polygonal shape.

9. Stock turning means comprising a hollow sleeve for reception of the stock, a chuck on and axially aligned with the sleeve for gripping the stock and preventing relative rotation between the stock and sleeve, a Geneva wheel mounted on and encircling the sleeve, and a rotary drive wheel provided with a pin for engaging the slots of the Geneva wheel and thereby imparting incremental movement to the sleeve.

10. Apparatus for producing shaped tubing from round tubular stock that is fed through the apparatus step by step, comprising oscillating stock shaping dies movable cyclically along the axis of the stock, a prime mover operatively connected to oscillate said shaping dies, stock gripping and turning means operatively mounted beyond the entry and exit sides of said shaping dies in the axis of stock feed, said gripping and turning means at the entry side of the dies during each oscillatory cycle for the dies tightly gripping the stock, turning the stock, and then relaxing its grip on the stock, all when the dies are in a predetermined segment of their oscillatory cycle, at which time they do not operate on the stock, said means relaxing its grip on the stock when the dies are shaping the stock, and drive means connected between said prime mover and said gripping and turning means.

11. The apparatus set forth in claim 10 wherein each of said gripping and turning means includes a collet grip and intermittently displaced element connected to said collet grip to also turn the collet grip intermittently, and a driver constantly rotating and having means thereon operative to effect said intermittent displacement of said element connected to said collet grip.

12. The apparatus of claim 10 wherein fluid pressure responsive means is operatively connected to said stock gripping and turning means, and means is operated in time with said prime mover to periodically influence said pressure responsive means.

References Cited

UNITED STATES PATENTS

| | | | |
|---|---|---|---|
| 3,411,336 | 11/1968 | Wadleck | 72—250 |
| 1,952,841 | 3/1934 | Coe | 72—214 |
| 2,914,973 | 12/1959 | Crane et al. | 72—208 |
| 3,030,835 | 4/1962 | Krause | 72—214 |

LOWELL A. LARSON, Primary Examiner